(12) United States Patent
Becker et al.

(10) Patent No.: US 8,460,579 B2
(45) Date of Patent: Jun. 11, 2013

(54) RED-EMITTING LUMINOPHORE AND LIGHT SOURCE COMPRISING SUCH A LUMINOPHORE

(75) Inventors: Daniel Becker, Augsburg (DE); Tim Fiedler, München (DE); Frank Jermann, Königsbrunn (DE); Bianca Pohl, München (DE); Martin Zachau, Geltendorf (DE)

(73) Assignee: OSRAM Gesellschaft mit beschränkter Haftung, Munich (DE)

( * ) Notice: Subject to any disclaimer, the term of this patent is extended or adjusted under 35 U.S.C. 154(b) by 0 days.

(21) Appl. No.: 12/596,081

(22) PCT Filed: Apr. 11, 2008

(86) PCT No.: PCT/EP2008/054389
§ 371 (c)(1),
(2), (4) Date: Oct. 15, 2009

(87) PCT Pub. No.: WO2008/125604
PCT Pub. Date: Oct. 23, 2008

(65) Prior Publication Data
US 2010/0096592 A1    Apr. 22, 2010

(30) Foreign Application Priority Data
Apr. 17, 2007  (DE) .......................... 10 2007 018 099

(51) Int. Cl.
*C09K 11/08* (2006.01)
*C09K 11/54* (2006.01)

(52) U.S. Cl.
USPC .............................. 252/301.4 F; 252/301.6 F

(58) Field of Classification Search
None
See application file for complete search history.

(56) References Cited

U.S. PATENT DOCUMENTS

| | | | |
|---|---|---|---|
| 7,252,788 B2 * | 8/2007 | Nagatomi et al. ...... | 252/301.4 F |
| 2003/0023161 A1 | 1/2003 | Govari et al. | |
| 2005/0189863 A1 | 9/2005 | Nagatomi et al. | |
| 2006/0006782 A1 | 1/2006 | Nagatomi et al. | |
| 2006/0045832 A1 | 3/2006 | Nagatomi et al. | |
| 2006/0150865 A1 * | 7/2006 | Isobe et al. ..................... | 106/438 |
| 2007/0040502 A1 | 2/2007 | Setlur et al. | |
| 2007/0114548 A1 | 5/2007 | Setlur et al. | |
| 2009/0322209 A1 | 12/2009 | Becker et al. | |
| 2012/0262052 A1 | 10/2012 | Oshio | |

FOREIGN PATENT DOCUMENTS

| | | |
|---|---|---|
| DE | 10 2006 036577 | 2/2008 |
| EP | 1 153 101 | 11/2000 |
| EP | 1 104 799 | 6/2001 |
| EP | 1 568 753 | 2/2005 |
| EP | 1 614 738 | 7/2005 |
| EP | 1 630 219 | 3/2006 |
| EP | 1 696 016 | 8/2006 |
| EP | 1 749 074 | 2/2007 |
| EP | 1 887 067 | 2/2008 |
| EP | 1995294 | * 11/2008 |
| JP | 2003-515655 | 5/2003 |
| JP | 2004-131770 | 4/2004 |
| JP | 2004-154548 | 6/2004 |
| JP | 2004-154734 | 6/2004 |
| JP | 2004-161871 | 6/2004 |
| JP | 2004-248405 | 9/2004 |
| JP | 2004-250739 | 9/2004 |
| JP | 2005-239985 | 9/2005 |
| JP | 2005-336253 | 12/2005 |
| JP | 2005-336450 | 12/2005 |
| JP | 2006-022286 | 1/2006 |
| JP | 2006-063214 | 3/2006 |
| JP | 2006-063233 | 3/2006 |
| JP | 2009-516774 | 4/2009 |
| JP | 2009-545660 | 12/2009 |
| WO | WO 01/40403 | 6/2001 |
| WO | WO 2005/049763 | 6/2005 |
| WO | WO 2005/103199 | 11/2005 |
| WO | WO 2006/126567 | 11/2006 |
| WO | WO 2007/120216 | 10/2007 |

OTHER PUBLICATIONS

German Translation of an Office Action dated Jun. 26, 2012 issued in the corresponding Japanese Patent Application No. 2010-503468.

* cited by examiner

*Primary Examiner* — Milton I Cano
*Assistant Examiner* — Sarah A Slifka
(74) *Attorney, Agent, or Firm* — Cozen O'Connor

(57) ABSTRACT

A red-emitting phosphor composed of an M-Al—Si—N system, comprising a cation M, wherein M is represented by at least one of the elements Ca or Ba or Sr and, if appropriate, can additionally be combined with at least one further element from the group Mg, Zn, Cd, wherein the phosphor is activated with Eu, which partly replaces M, and wherein the phosphor additionally contains LiF.

8 Claims, 2 Drawing Sheets

RED-EMITTING LUMINOPHORE AND LIGHT SOURCE COMPRISING SUCH A LUMINOPHORE

RELATED APPLICATIONS

This is a U.S. national stage of application No. PCT/EP2008/054389, filed on Apr. 11, 2008.

This application claims the priority of German application no. 10 2007 018 099.5 filed Apr. 17, 2007, the entire content of which is hereby incorporated by reference.

FIELD OF THE INVENTION

The invention is related to a red-emitting phosphor and a light source comprising such a phosphor.

BACKGROUND OF THE INVENTION

EP-A 1 568 753 and EP-A 1 614 738 disclose a phosphor which emits in the red and has the composition MSiAlN3:Z. In this case, M is principally Ca and the activator Z is principally Eu. They are referred to here as calsins. Said phosphor can be excited well in the UV and blue spectral range. It is suitable for light sources such as LEDs.

EP-A 1 153 101 discloses a red-emitting phosphor of the type nitride M2Si5N8:Eu, wherein M can be Ca inter alia, and the activator is Eu.

SUMMARY OF THE INVENTION

One object of the present invention is to provide a narrow-band, thermally stable phosphor which emits in the red. In this case, the dominant wavelength is intended to be greater than 610 nm and the phosphor is intended to be suitable for use with UV and blue LEDs.

This and other objects are attained in accordance with one aspect of the present invention directed to a red-emitting phosphor composed of an M-Al—Si—N system, comprising a cation M, wherein M is represented by at least one of the elements Ca or Ba or Sr and, if appropriate, can additionally be combined with at least one further element from the group Mg, Zn, Cd, wherein the phosphor is activated with Eu, which partly replaces M, and wherein the phosphor additionally contains LiF As in the case of the nitrides, the previously known systems are distinguished by very high efficiency and thermal stability, but have the disadvantage of the broadband emission. Although the known calsins exhibit narrower-band emission than the nitrides and a better absorption in the blue, the thermal stability of the luminescence is poorer than in the case of the nitrides. Moreover, a shorter-wave emission is desirable in specific applications, in particular in order to obtain a higher visual useful effect.

According an embodiment of the invention, fluorides are now added in the synthesis of calsins. This improves the phase formation, grain form and also the homogeneity of the phosphor. In order not to obtain any impurities as a result of foreign ions, in practice use is usually made of fluorides together with cations which are present in the target compound. In the case of CaSiAlN3:Eu this is therefore CaF2, AlF3 or else EuF3. LiF is likewise known, in principle, as a flux, that is to say in the typical small quantities suitable therefor. It has surprisingly been found, however, that LiF becomes incorporated into the target compound in significant quantities and at the same time significantly improves the properties of the calsins.

The novel phosphor is suitable for example for color on demand LEDs or for white LEDs or else other light sources such as lamps. It can be tailored to different color temperatures and applications having high efficiency and good color rendering.

As a result of the incorporation of Li ions into the lattice, the thermal stability of the phosphor, the so-called thermal quenching thereof, is significantly improved without other properties of the phosphor being adversely altered. The centroid and peak of the emission surprisingly shift in the direction of a shorter wavelength given a constant Eu content. This tends to increase the efficiency. From a theoretical point of view, by contrast, a long-wave shift would more likely be expected. The reasons for this reside theoretically in a coarser grain and in an increased self-absorption of the short-wave emission components with the use of LiF. However, these considerations have not been borne out.

Even the quantum efficiency and the radiation stability tend to improve.

BRIEF DESCRIPTION OF THE DRAWINGS

The invention will be explained in more detail below on the basis of an exemplary embodiment. In the figures.

PREFERRED EMBODIMENT OF THE INVENTION

Figure 1:
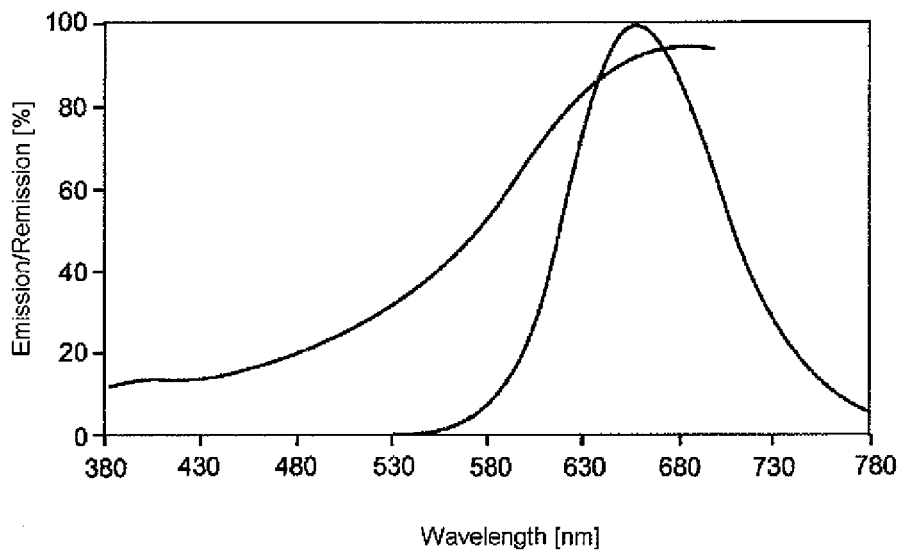
FIG. 1 shows the emission and reflection spectrum of a fluoridated calsin phosphor.

FIG. 1 shows the emission and reflection spectrum of a fluoridated calsin phosphor having the nominal composition in the sense of batch stoichiometry $Ca_{0.88}Eu_{0.02}Li_{0.1}AlSi(N_{0.967}F_{0.033})_3$. The emission maximum is approximately 655 nm.

Figure 2:
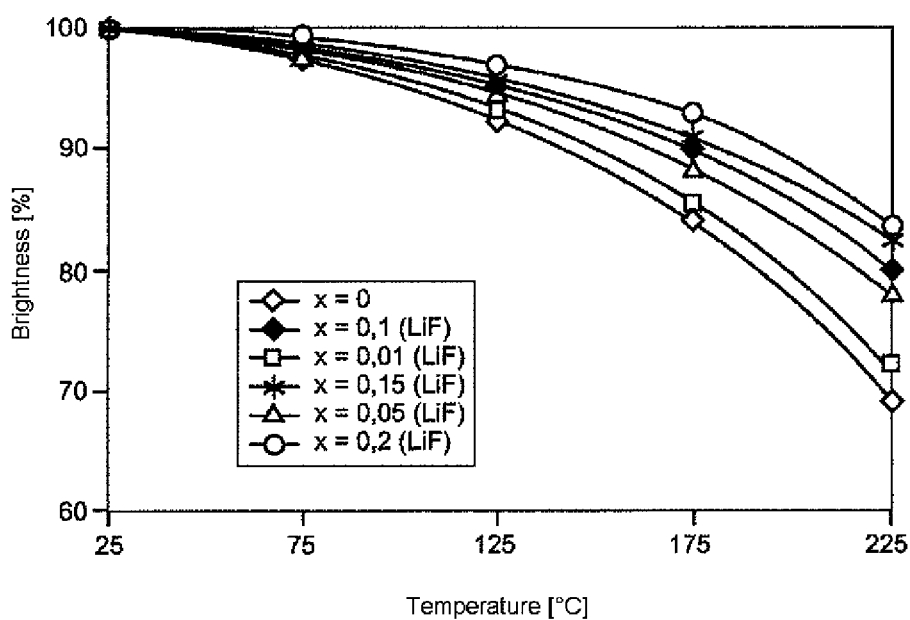
FIG. 2 shows the thermal quenching behavior of a fluoridated calsin phosphor as a function of the weighed-in amount of LiF.

FIG. 2 shows the thermal quenching behavior for various LiF proportions as a function of the temperature. Curve 1 is calsin $Ca_{0.98}Eu_{0.02}AlSiN$ without admixture of LiF. Curve 2 shows the stability of a calsin with 1 mol % proportion of Li in M, where here M=Ca. Curve 3 shows 5 mol % proportion of Li in M and curve 4 shows 10 mol % proportion of Li in M. It holds true here in each case that identical molar amounts F likewise become incorporated for N, in the sense of the formula above.

Figure 3:
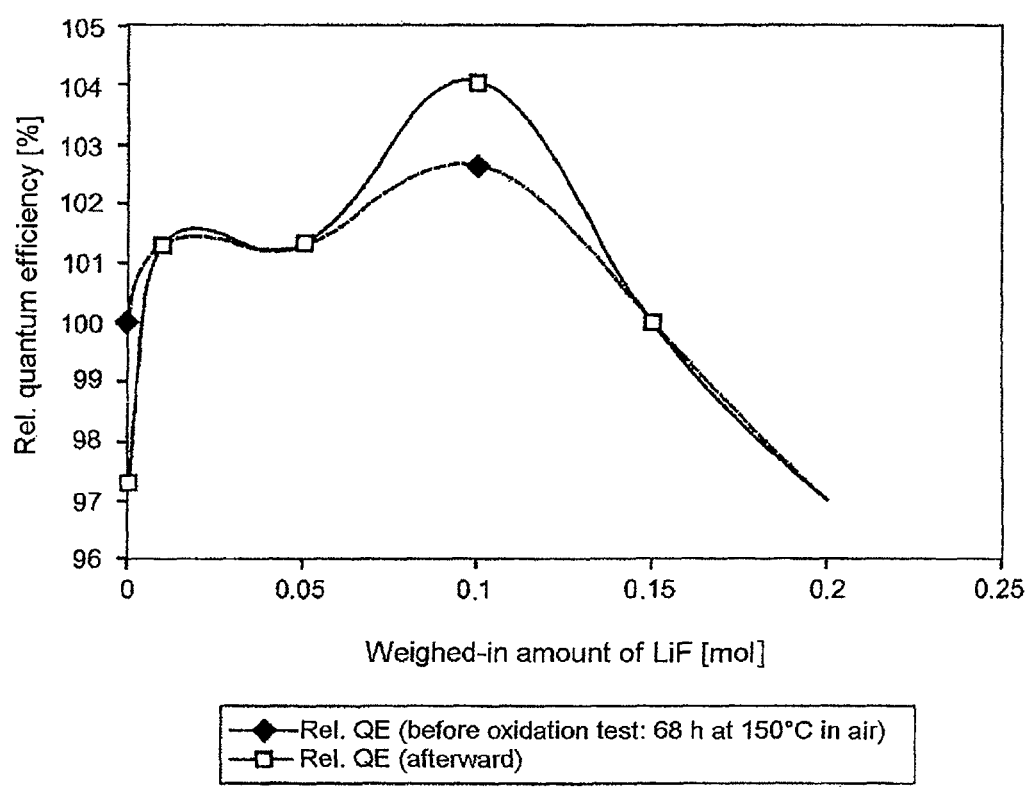
FIG. 3. shows the effect of the weighed-in amount of LiF on the oxidation stability of the calsin phosphor.

FIG. 3 shows the effect of the weighed-in amount of LiF on the oxidation stability of the calsin phosphor. A complex pattern of behavior is manifested here. The illustration shows the relative quantum efficiency before the oxidation test (dashed line) and afterward (solid line). While the use of small amounts of LiF rather impairs the quantum efficiency, a measurable improvement in the oxidation stability is manifested starting from a weighed-in quantity of LiF of 5 mol %. It increases further, as the content of LiF increases, up to an LiF proportion of 10 mol %. At a higher proportion, the stability deteriorates again. At 15 mol %, both curves have an identical behavior.

What is suitable as a basic phosphor, in principle, is a red-emitting phosphor composed of the M-Al—Si—N system, comprising a cation M, where M is represented by Ca or Ba or Sr alone or in a mixture or can additionally be combined with at least one further element from the group Mg, Zn, Cd, wherein the phosphor is activated with Eu.

The proportion of LiF should be at most 15 mol %, relative to M.

Preferably, the proportion of LiF should be at least 1 mol %, relative to M.

Advantageously, Ca alone or very predominantly, that is to say to the extent of more than 70 mol % of Ca, should be used for M.

The production of the novel phosphor can be carried out for example as follows, explained using the example of (Ca, Eu)AlSiN3—LiF(2 mol %):

The starting substances Ca3N2 (6.02 g), AlN (6.02 g), LiF (0.57 g), Si3N4 (6.87 g) and Eu2O3 (0.52 g) are mixed in the glove box and with the aid of a mixer.

The batch mixtures are cooled in a tubular furnace under an inert atmosphere, preferably N2 with addition of FG, for a number of hours at temperatures of around 1450 to 1680° C. In this case, the heating and cooling rate is approximately 150 to 300 K/h.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A red-emitting phosphor composed of an M-Al—Si—N—LiF system, comprising a cation M, an activator Eu, and LiF, wherein M is selected from the group consisting of elements Ca, Ba, Sr, and combinations thereof; the proportion of LiF is at least 1 mol %, based on the total molar amount of M, Eu, and LiF; and the LiF is included in the lattice of the phosphor.

2. The phosphor as claimed in claim 1, wherein the proportion of LiF is at most 15 mol % based on the total molar amount of M, Eu, and LiF.

3. The phosphor as claimed in claim 1, wherein the proportion of LiF is at least 2 mol %, based on the total molar amount of M, Eu, and LiF.

4. The phosphor as claimed in claim 1, wherein M comprises more than 50 mol % Ca based on the total molar amount of M.

5. A light source comprising a phosphor as claimed in claim 1.

6. The phosphor as claimed in claim 1, wherein M additionally comprises at least one of elements Mg, Zn, and Cd.

7. The phosphor as claimed in claim 1, wherein the proportion of LiF is at least 5 mol %, based on the total molar amount of M, Eu, and LiF.

8. The phosphor as claimed in claim 1, wherein the phosphor is $M_{1-b}(LiF)_b AlSiN_3$:Eu and wherein b is at least 0.1 mol %, based on the total molar amount of M, Eu, and LiF.

* * * * *